United States Patent
Paden et al.

(10) Patent No.: US 8,204,204 B2
(45) Date of Patent: Jun. 19, 2012

(54) METHOD AND APPARATUS FOR PROPER ROUTING OF CUSTOMERS

(75) Inventors: Jon Paden, Austin, TX (US); Bobby Sams, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1240 days.

(21) Appl. No.: 11/157,775

(22) Filed: Jun. 21, 2005

(65) Prior Publication Data

US 2007/0003042 A1 Jan. 4, 2007

(51) Int. Cl.
*H04M 3/00* (2006.01)
*H04M 5/00* (2006.01)

(52) U.S. Cl. .......... 379/265.01; 379/265.02; 379/265.11

(58) Field of Classification Search ............. 379/265.11, 379/265.12, 265.13, 93.12, 266.02, 142.15, 379/88.22, 265.02, 265.01; 709/224; 715/810
See application file for complete search history.

(56) References Cited

U.S. PATENT DOCUMENTS

| | | | |
|---|---|---|---|
| 6,038,293 A * | 3/2000 | McNerney et al. | 379/88.19 |
| 6,061,433 A * | 5/2000 | Polcyn et al. | 379/93.12 |
| 6,554,183 B1 | 4/2003 | Sticha et al. | |
| 6,819,748 B2 * | 11/2004 | Weiss et al. | 379/93.12 |
| 6,819,756 B2 | 11/2004 | Stumer et al. | |
| 7,283,963 B1 * | 10/2007 | Fitzpatrick et al. | 704/270.1 |
| 7,536,002 B1 * | 5/2009 | Ma et al. | 379/266.02 |
| 7,792,258 B1 * | 9/2010 | Smith et al. | 379/142.15 |
| 2001/0014146 A1 | 8/2001 | Beyda et al. | |
| 2002/0034940 A1 | 3/2002 | Takae et al. | |
| 2002/0164011 A1 | 11/2002 | Stumer et al. | |
| 2003/0026409 A1 | 2/2003 | Bushey et al. | |
| 2003/0212558 A1 | 11/2003 | Matula | |
| 2004/0059841 A1 | 3/2004 | Bateman et al. | |
| 2004/0071275 A1 | 4/2004 | Bowater et al. | |
| 2004/0122941 A1 * | 6/2004 | Creamer et al. | 709/224 |
| 2006/0218506 A1 * | 9/2006 | Srenger et al. | 715/810 |

* cited by examiner

*Primary Examiner* — Ahmad Matar
*Assistant Examiner* — Sonia Gay
(74) *Attorney, Agent, or Firm* — Greenblum & Bernstein, P.L.C.

(57) ABSTRACT

A customer-agent routing system (102) has a memory (102B) for storage, and a processor (102A) for controlling operations of the memory. The processor is programmed to retrieve (210) from the memory historical information about a calling party, restrict (212) access to one or more of a plurality of services according to the retrieved historical information, and process (218) a service request from the calling party according to the restricted services.

17 Claims, 2 Drawing Sheets

METHOD AND APPARATUS FOR PROPER ROUTING OF CUSTOMERS

FIELD OF THE INVENTION

This invention relates generally to service center routing technologies, and more particularly to a method and apparatus for proper routing of customers.

BACKGROUND OF THE INVENTION

Service centers often have banks of representatives (agents) who serve a number of customer needs such as, for example, billing inquiries, request for new services, request for change of services, request for technical assistance after installation, and so on.

Typically, IVR (Interactive Voice Response) systems are utilized for routing customers according to exchanges with the customer. There are circumstances, however, where a customer is inadvertently routed to an inappropriate service or agent due to the limited information provided by the customer.

SUMMARY OF THE INVENTION

Embodiments in accordance with the invention provide a method and apparatus for proper routing of customers.

In a first embodiment of the present invention, a computer-readable storage medium operates as an interactive voice response (IVR) system accessible by a calling party over a communication system. The storage medium has computer instructions for retrieving historical information about a calling party, restricting access to one or more of a plurality of services according to the retrieved historical information, and processing a service request from the calling party according to the restricted services.

In a second embodiment of the present invention, a customer-agent routing system has a memory for storage, and a processor for controlling operations of the memory. The processor is programmed to retrieve from the memory historical information about a calling party, restrict access to one or more of a plurality of services according to the retrieved historical information, and process a service request from the calling party according to the restricted services.

In a third embodiment of the present invention, a method is provided for an interactive voice response (IVR) system. The method has the steps of retrieving historical information about a calling party, restricting access to one or more of a plurality of services according to the retrieved historical information, and processing a service request from the calling party according to the restricted services.

DETAILED DESCRIPTION OF THE DRAWINGS

Figure 1:
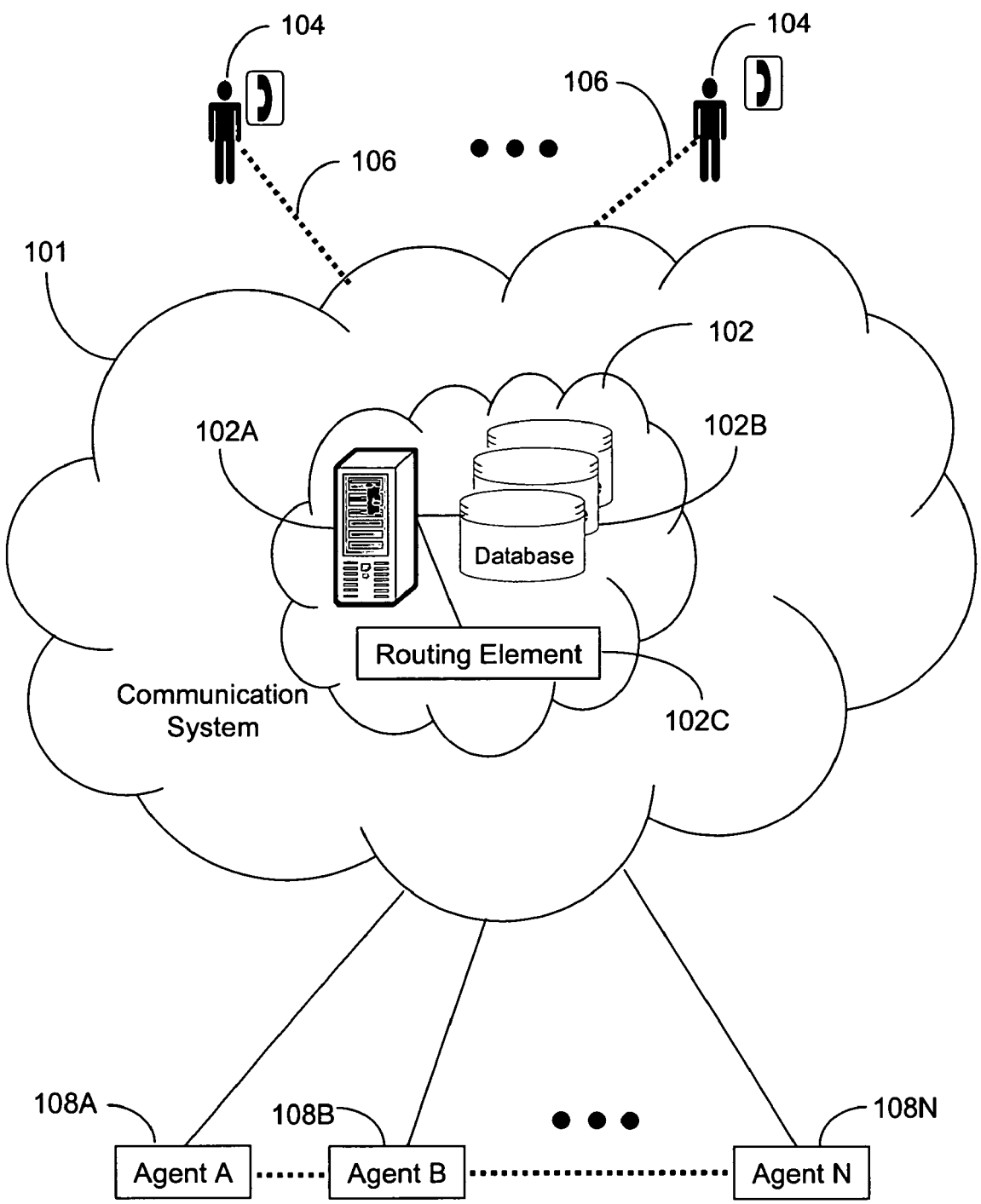
FIG. 1 is block diagram of a customer-agent routing system operating in a communication system according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram 100 of a customer-agent routing system 102 operating in a communication system 101 according to an embodiment of the present invention. The customer-agent routing system 102 comprises conventional technology such as a routing element 102C, a memory 102B, and processor 102A. The processor 102A can utilize one or more conventional computers or servers for controlling operations of the customer-agent routing system 102. The memory 102B utilizes one or more conventional media devices (such as a high capacity disk drive, Flash memory, Dynamic Random Access Memory, floppy disks, or other like memories) for storage purposes, and can be used for managing databases of a service provider of said system 102. The databases can be used for recording customer information such as, for example, billing information, services rendered, services pending, and other relevant information. Additionally, said databases can be managed by, for example, a conventional CRM (Customer Relations Management) system.

The routing element 102C can comprise conventional routing technology similar to that of an ACD (Automatic Call Distributor) for routing customers 104 to selected agents 108A-N coupled to the communication system 101. In the present context an agent 108 can be a human agent, or a computing system such as an IVR (Interactive Voice Response) system emulating a human agent by way of voice recognition technology and text-to-speech technology for exchanging messages with the customer 104. Additionally, each agent 108 can serve a specialized function such as for example, billing, technical support, new service installation, updating current services, and so on. The customer-agent routing system 102 can utilize the functionality of a conventional IVR system for interacting with the customer 104. Although the processor 102A, memory 102B and routing element 102C are shown separately, they can be in the alternative an integral unit.

It should also be noted that the communication system 101 can utilize wire line and/or wireless technologies for providing the customer 104 access to the customer-agent routing system 102 in a geographic region covered by said system 101. The customer 104 is coupled to the communication system 101 by way of a wire line or wireless interface 106 for exchanging communications.

Figure 2:
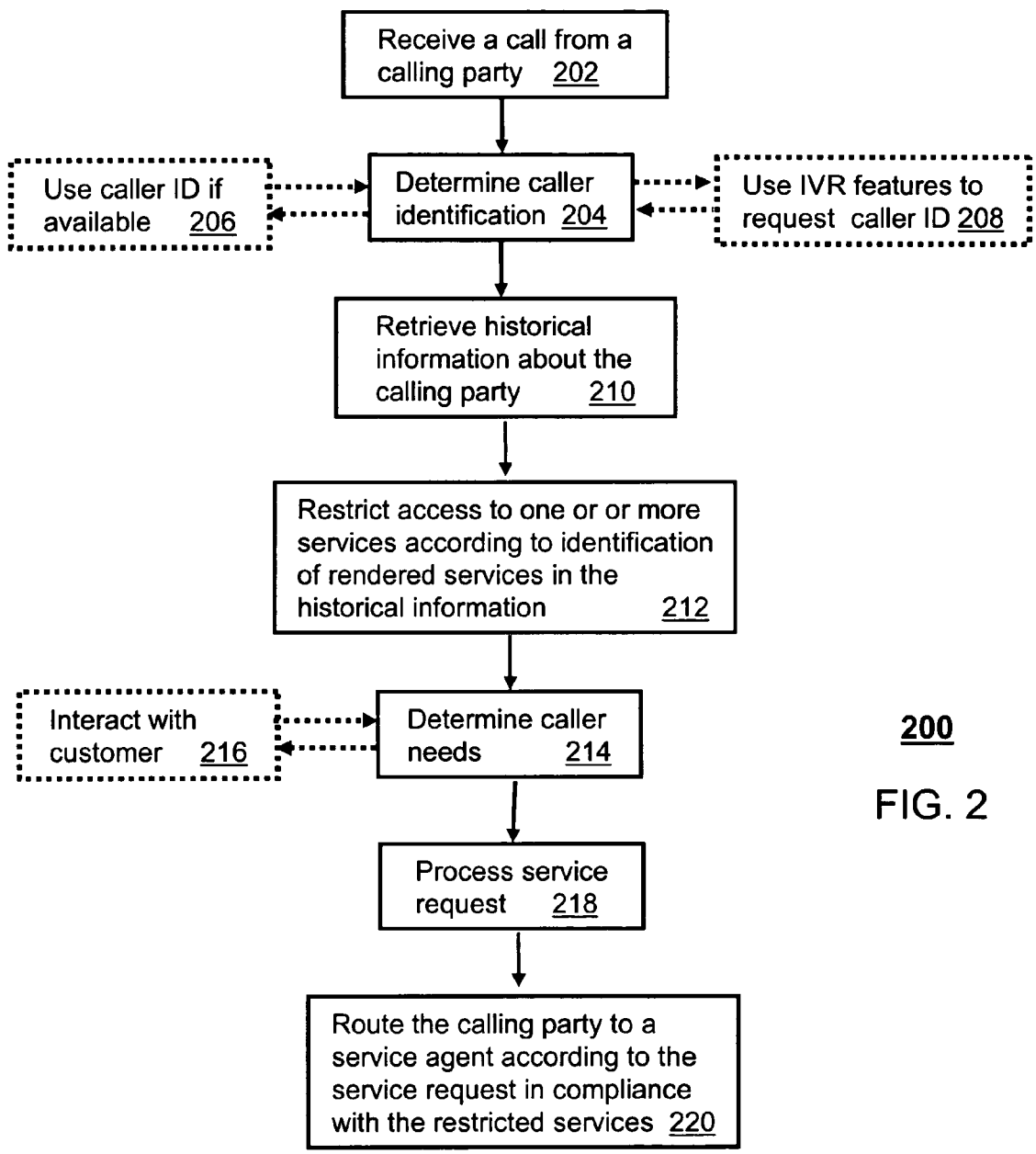
FIG. 2 depicts a flow chart of a method operating in the customer-agent routing system according to an embodiment of the present invention.

FIG. 2 depicts a flow chart of method 200 operating in the customer-agent routing system 102 according to an embodiment of the present invention. Method 200 begins with step 202 where a call is received from a calling party 104. In step 204, the customer-agent routing system 102 determines the caller's identification. This determination can be made in step 206 if a caller number of the calling party 104 is available, or in step 208 where the IVR functions of the customer-agent routing system 102 are used to interact with the calling party 104 to determine the caller's identification. Said interaction can take place by way of one or more voice responses and/or data responses (e.g., DTMF—Dual Tone Multi-Frequency Tones) provided by the calling party 104. The caller's identification can be a name, an address, billing account number, or any other form of identification useful for indexing through the databases of memory 102B to retrieve information about the calling party 104.

Once a caller ID is available, the customer-agent routing system 102 proceeds to step 210 to retrieve historical information about the calling party 104 from one or more of the databases 102B managed by the CRM. The historical information can be utilized to assess which services have and have not been rendered. With this information, the customer-agent routing system 102 can restrict access to one or more services according to rendered services identified in the retrieved historical information. Once these services have been flagged as restricted, the customer-agent routing system 102 proceeds to step 214 where it determines the caller's needs. This determination can be made by the IVR function of the customer-agent routing system 102 in step 216. In this step, the IVR interacts with the calling party 104 providing one or more selections to the calling party 104 to choose from. Said selection is limited, however, by the restricted services flagged in step 212. If, for example, specific installation services have already been provided to the calling party 104, the IVR will not offer said services as an option to the caller.

Once the calling party 104 makes a selection, the customer-agent routing system 102 proceeds to step 218 to process a service request from the calling party 104, thereafter routing in step 220 the calling party 104 to a service agent 108 according the service request and in compliance with the restricted services identified in step 212. An artisan with skill in the art will appreciate that the aforementioned embodiments substantially diminish the possibility that the calling party 104 will be routed to a service center 108 which has already rendered services, and wherein no further assistance can be provided. By suppressing inadvertent routes of a calling party to a service center 108 that can no longer render appropriate services, the present invention makes the service centers 108A-N more productive and efficient, while the calling party 104 can experience a more effective service response from the service provider's network 101.

It should be evident by now that the present invention can be realized in hardware, software, or a combination of hardware and software. Moreover, the present invention can be realized in a centralized fashion, or in a distributed fashion where different elements are spread across several interconnected processors. Any kind of computer device or other apparatus adapted for carrying out method 200 described above is suitable for the present invention.

Additionally, the present invention can be embedded in a computer program product, which comprises all the features enabling the implementation of method 200, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident that the present invention may be used for many applications. Thus, although the description is made for particular arrangements and methods, the intent and concept of the invention is suitable and applicable to other arrangements and applications not described herein. It would be clear therefore to those skilled in the art that modifications to the disclosed embodiments described herein could be effected without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. At least one non-transitory computer readable medium that stores a set of executable instructions for providing an interactive voice response (IVR) service accessible by a calling party over a communication system, the set of executable instructions, when executed by at least one processor, directing the at least one processor to perform acts of:
   retrieving historical information about the calling party;
   determining previously rendered telecommunications services for the calling party based on the historical information and flagging the previously rendered telecommunications services as being restricted;
   presenting selections of additional telecommunications services distinct from the previously rendered telecommunications services and denying presentation of the previously rendered telecommunications services;
   receiving a designation of one of the selections;
   routing the calling party to a service center that provides at least a designated additional telecommunications service that corresponds to the designation and suppressing routing between the calling party and a service center that provides the previously rendered telecommunications services and does not provide any of the additional telecommunications services.

2. The at least one non-transitory computer readable medium of claim 1,
   wherein the set of executable instructions further comprises executable instructions directing the at least one processor to request identification information from the calling party.

3. The at least one non-transitory computer readable medium of claim 2,
   wherein the set of executable instructions further comprises executable instructions directing the at least one processor to receive the identification information from at least one response from the calling party.

4. The at least one non-transitory computer readable medium of claim 1,
   wherein the set of executable instructions further comprises executable instructions directing the at least one processor to determine a caller identity from a calling number of the calling party.

5. The at least one non-transitory computer readable medium of claim 1,
   wherein the designation is generated based on at least one data response and at least one voice response.

6. A customer-agent routing system, comprising:
   a memory that stores historical information about a calling party; and
   at least one processor that retrieves the historical information from the memory, flags and restricts access to at least one of a plurality of telecommunication services based on the retrieved historical information, presents selections of additional telecommunications services distinct from restricted telecommunications services and denies presentation of the restricted telecommunications services, receives a designation of one of the selections, and processes a service request from the calling party based on the at least one of the plurality of telecommunication services by routing the calling party to a service center that provides at least a designated additional telecommunications service that corresponds to the designation and suppressing routing of the service request to a service center that cannot render any of the additional telecommunications services, beyond previously rendered services, to the calling party.

7. The customer-agent routing system of claim 6, further comprising:
a routing element coupled to the at least one processor and to a communication system that accepts calls from at least one of the calling party and customers and that routes the calls to a service agent,
wherein the at least one processor instructs the routing element to route the calling party to the service agent based on the service request and the at least one of the plurality of telecommunication services.

8. The customer-agent routing system of claim 6,
wherein the at least one processor requests identification information from the calling party.

9. The customer-agent routing system of claim 8,
wherein the at least one processor receives the identification information from at least one response from the calling party.

10. The customer-agent routing system of claim 6,
wherein the at least one processor determines a caller identity from a calling number of the calling party.

11. The customer-agent routing system of claim 6,
wherein the at least one processor restricts access based on at least one of the previously rendered services, and
wherein the previously rendered services are identified from the historical information.

12. The customer-agent routing system of claim 6,
wherein the at least one processor receives the service request from at least one response from the calling party.

13. A method for handling calls using an interactive voice response (IVR), comprising:
retrieving historical information about a calling party;
flagging and restricting access to at least one of a plurality of telecommunication services based on previously rendered services identified from the retrieved historical information;
presenting selections of additional telecommunications services distinct from the previously rendered services and denying presentation of restricted telecommunications services;
receiving a designation of one of the selections; and
processing a service request from the calling party based on the at least one of the plurality of telecommunication services by routing the calling party to a service center that provides at least a designated additional telecommunications service that corresponds to the designation and suppressing routing of a call initiated by the calling party to a service center that provides the previously rendered services and does not provide any of the additional telecommunications services.

14. The method of claim 13, further comprising:
routing the call from the calling party to a service agent based on the service request and the at least one of the plurality of telecommunication services.

15. The method of claim 13, further comprising:
requesting identification information from the calling party.

16. The method of claim 15, further comprising:
receiving the identification information from at least one response from the calling party.

17. The method of claim 13, further comprising:
determining a caller identity from a calling number for the calling party.

* * * * *